United States Patent [19]
Cestaro et al.

[11] 3,973,991
[45] Aug. 10, 1976

[54] LIGHT-WEIGHT LEAD-ACID BATTERY WITH LAMINATED ELECTRODES

[75] Inventors: John P. Cestaro, Trenton; Uriel Sokolov, Princeton, both of N.J.

[73] Assignee: NL Industries, Inc., New York, N.Y.

[22] Filed: Mar. 5, 1975

[21] Appl. No.: 555,569

Related U.S. Application Data

[63] Continuation-in-part of Ser. No. 330,316, Feb. 13, 1973, abandoned, which is a continuation-in-part of Ser. No. 251,935, May 10, 1972, abandoned.

[52] U.S. Cl. .................................. 136/26; 136/27
[51] Int. Cl.² .................................. H01M 35/08
[58] Field of Search .......................... 136/26–27, 136/35, 68, 75, 66, 46; 75/208; 29/182.2, 182.5, 191; 161/170

[56] References Cited
UNITED STATES PATENTS

| | | |
|---|---|---|
| 2,883,443 | 4/1959 | Ruetschi et al. ............... 136/68 |
| 3,194,685 | 7/1965 | Malloy ............................ 136/27 |
| 3,305,401 | 2/1967 | Aulin ............................. 136/120 |
| 3,447,969 | 6/1969 | Tudor et al. .................... 136/26 |
| 3,472,696 | 10/1969 | Shoeld ........................... 136/13 |
| 3,488,218 | 1/1970 | Metzler et al. ............. 136/26 X |
| 3,532,544 | 10/1970 | Nozaki et al. ................. 136/27 |

Primary Examiner—Anthony Skapars

[57] ABSTRACT

A light-weight lead-acid battery has been prepared which contains a novel light weight electrode assembly. The electrode assembly comprises a laminated electrode having at least three plies, the center ply being a conductive sheet and the outer two plies being sheets of porous, compressed and sintered homogeneous composite of synthetic fibers and lead oxide powder material.

2 Claims, 2 Drawing Figures

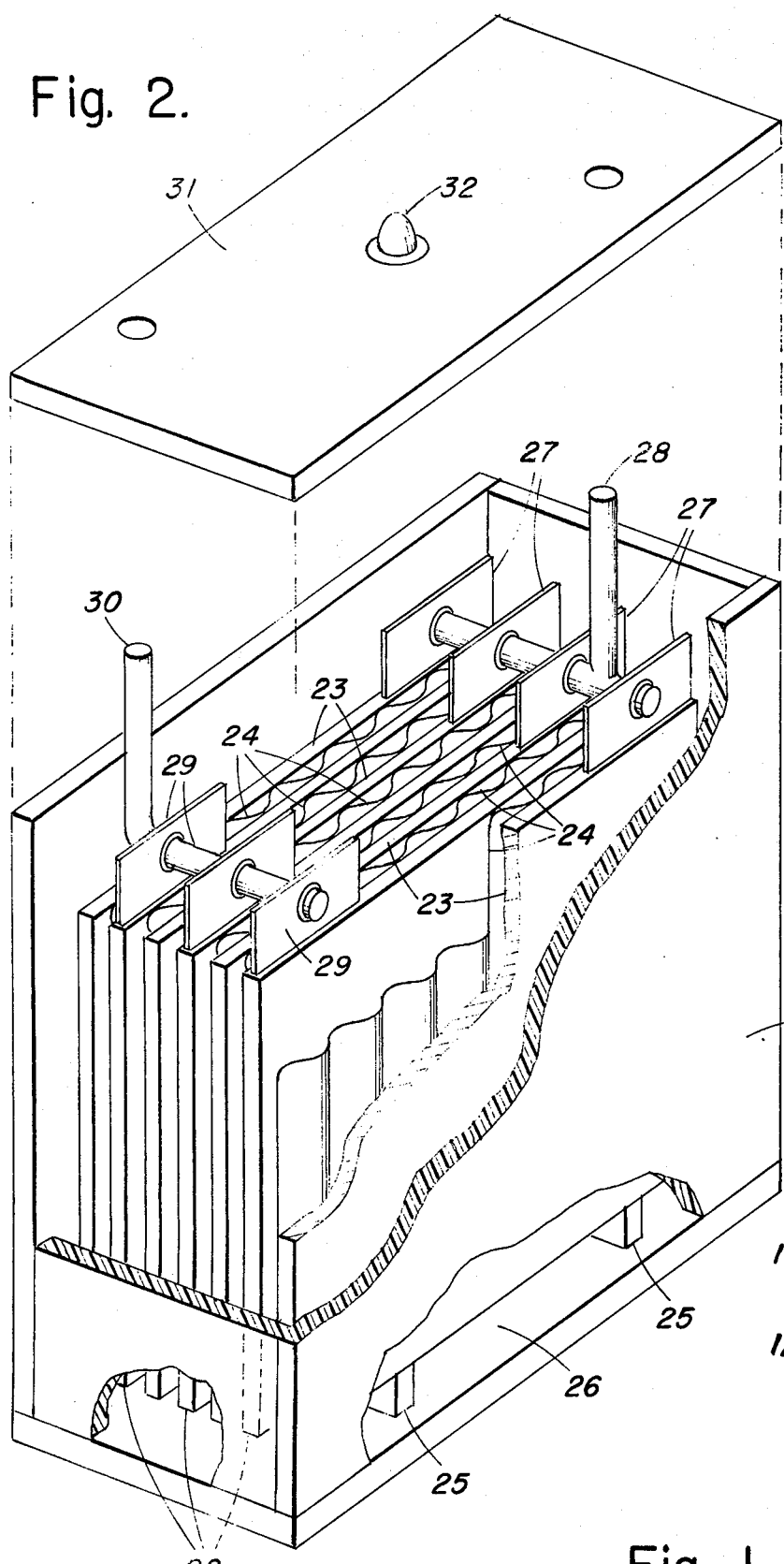
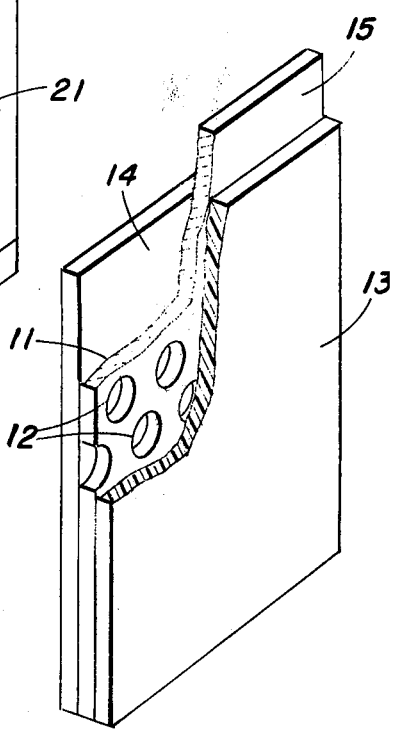
Fig. 2.
Fig. 1.

LIGHT-WEIGHT LEAD-ACID BATTERY WITH LAMINATED ELECTRODES

This application is a continuation-in-part of application Ser. No. 330,316 filed Feb. 13, 1973, now abandoned, which in turn is a continuation-in-part of parent application Ser. No. 251,935 filed May 10, 1972, now abandoned.

BACKGROUND OF THE INVENTION

The prior art is replete with many different types of lead-acid battery and electrode designs including electrodes which employ a heavy metal framework pasted with a mixture of lead oxide power and sulfuric acid. Such electrode designs are not preferred in batteries which require light-weight applications.

SUMMARY OF THE INVENTION

A light-weight lead-acid battery has been prepared which utilized a novel laminated electrode structure. The laminated electrode contains at least three plies, one of the said plies being a conductive sheet and the other of said plies being a porous, compacted and sintered sheet comprising a homogeneous composite of synthetic fibers and active powder material.

This lead-acid battery is light in weight since the battery plates are composed of the three-ply laminated electrode structures described above. These plates are approximately 30-50% lighter in weight in comparison to the prior art pasted battery grids containing the same amount of active material. In addition, these composite electrodes being much lighter in weight and more flexible than the normal battery grids, may be formed into various irregular shapes such as bent, curved, spiral, cylindrical, and the like, which is not possible with the well-known pasted battery grids.

The center ply of the three-ply laminated structure is a thin sheet of conductive material, such as a thin metal sheet or paper sheet containing the conductive material, preferably a thin perforated lead sheet, sandwiched between two light-weight compressed and sintered composite sheets, composed of synthetic fibers and active powder material, such as PbO, Pb, tribasic lead sulfate or tetrabasic lead sulfate.

DESCRIPTION OF THE DRAWINGS

Referring to the drawings:

FIG. 1 is cut-away vertical perspective view of a laminated electrode having a three-ply structure.

FIG. 2 is a cut-away vertical perspective view of a light-weight lead-acid battery which employs as plates seven of the laminated composite electrodes described above.

In FIG. 1, a thin sheet of lead foil 11, having perforations 12, is laminated with two composite sheets 13 and 14, of synthetic fibers and lead oxide powder material. A ½ inch extension of the lead foil extends above the composite sheets to form a tab 15, for connecting the electrodes. The lead foil sheet is electrically conductive and the composite sheets are porous, compressed and sintered, homogeneous mixtures of the fibers and the lead oxide material.

In FIG. 2, the laminated composite electrodes described in FIG. 1 are used as plates in the battery assembly. The battery comprises a plastic casing 21, and seven laminated composite electrodes, three of which act as positive plates 22, and four as negative plates 23. The battery plates are separated from one another by separators 24, and are placed at the bottom on support 25. These supports extend along the width of the battery and provide a well space 26, for the collection of any active materials which drop from the battery plates during usage.

The four negative plates are connected by soldering their negative tabs 27, to negative terminal 28. The three positive plates are likewise connected by soldering the positive tabs 29, to the positive terminal 30. A cover 31, is provided for the battery and contains holes for the terminals and an air vent 32, to allow the gases to escape. In operating the battery, dilute sulfuric acid is added to a level above the battery plate.

DESCRIPTION OF THE PREFERRED EMBODIMENTS

When the lead-acid battery contains the instant electrodes assembly, the battery produced is light in weight and produces efficient operation with good cycle life. The electrode assembly possesses good mechanical strength and is easy and economical to prepare. The electrode assembly is prepared as follows:

The conductive sheet forming the center ply of the three-ply laminated structure may be either a lead or lead alloy foil or metal sheet or a paper sheet containing a conductive material. It is preferably composed of a perforated thin lead sheet having open space area up to 90% of the total over-all area of the conductive sheet.

The use of a perforated sheet is particularly desirable since the holes may be filled with the fibers and active material when the three-ply structure is laminated, thus forming a strong, close bonded laminate.

The sheet may also be constructed of conductive papers and the like which contains, for example, finely divided graphite or granular lead metal particles, any of which act as the current collector. The conductive sheet used as the current collector may be either flexible or rigid.

The synthetic fibers contemplated for use in the composite sheet of the instant invention are those which are substantially unattached by (1) the electrolyte, such as sulfuric acid, present in the battery, (2) the active material present or formed in the composite sheet, and (3) the gases which are normally evolved during the charging and the discharging of the battery. Such fibers include polyethylene and polypropylene.

It is particularly desirable to use fibers having a length (in millimeters) and denier such that the numerical product of the length of said fibers multiplied by the denier is no greater than 25. These fibers may be either monofilaments or fiber bundles which simulate cellulose fibers.

It has also been discovered that up to about 10% of these synthetic fibers may be replaced with natural fibers if desired.

The active materials which may be used in the composite sheet are either lead metal powders or lead compounds which are ordinarily used as active materials in the preparation of lead acid battery grids such as PbO or Pb, tribasic lead sulfate and tetrabasic lead sulfate. The amount of active material such as lead oxide powder material employed in the composite sheet may vary considerably. It is preferred, however, to have from 50 to 99 parts by weight active material in the composite sheet for each part of synthetic fiber.

This light-weight battery electrode assembly is prepared in an easy and economical manner. The homogeneous composite of synthetic fibers and active material, such as lead oxide powdered material, forming the composite sheet is prepared by a method similar to making sheets in the paper industry. The synthetic fibers which are normally coated with a surfactant, are dispersed in water with agitation and thoroughly mixed to form a slurry containing about 0.05% to 0.2% solids. To this fiber slurry is added the lead oxide powder material and after thoroughly mixing a flocculating agent is added. The pH of the slurry is then lowered until a large flocculated mass of fibers and lead oxide is obtained. The flocculated mass is filtered and collected on a screen to form a composite sheet of a loose homogeneous mat of fibers coated with the lead oxide powder.

After drying in air, the composite sheet material is placed on both sides of a conductive sheet, for example, a perforated metal sheet of lead, and the three component structure is compressed and heated from 120°C to 200°C under pressure from atmospheric to 13,000 psi, to obtain a three-ply laminated electrode structure.

In order to describe the instant invention more fully, the following examples are presented:

EXAMPLE 1

A laminated three-ply electrode was prepared as follows:

1.9 grams of polypropylene fibers (3 denier, 3 millimeters long and 0.025 millimeters wide) coated with a surfactant, were wetted with 5 ml of isopropanol. The wetted fibers were placed in a Waring Blender with 100 ml of water. After an initial mixing, 800 ml of water were then added and mixed for one minute.

After transferring to a larger container, water was added to make up the volume to 1200 ml, 25.2 grams of lead oxide (battery grade PbO) were then added to the fiber slurry and the mixture was thoroughly mixed.

25 grams of a 0.5% aqueous solution of xantham gum (Keltrol sold by Kelco Company) were added to the mixture and with stirring papermakers' grade alum solution was added to lower the pH of the slurry from 9 to 4 at which point the fiber-lead oxide mixture formed a large flocculated mass.

The slurry containing the flocculated mass was poured quickly into a hand sheet mould and the mould was filled with water to produce a stock consistency of 0.5% solids. After thoroughly stirring the slurry, a "paper" sheet was cast onto a wire screen (40 mesh) by draining. The hand sheet was removed from the wire screen and allowed to dry. The sheet contained 95% lead oxide by weight.

The laminated three-ply electrode was prepared as follows:

A conductive metal sheet was selected which consisted of a 2 ¼ × 5 inch piece of lead foil 19 mils thick. The lead foil was perforated in a honeycomb pattern, of 3/16 inch holes leaving an over-all open space of 56%. One of the narrow ends of the foil remained without holes forming a ½ inch tab of solid foil along the end.

The composite sheet described above was cut into two sections of 1 ¾ × 5 inches and the perforated metal foil was placed between the hand sheets and laminated together by hot pressing the two sheets to a pressure of 1200 lbs/sq. in. and 165°C for a period of 10 minutes.

A three-plate cell using the electrode was prepared as follows:

The laminated electrode was cut into electrode strips 1 × 2 ¼ inches, the strips were edge coated in paraffin, an 1/8 inch lead rod was soldered onto the solid lead taab extending from the metal foil. Three of these strips were placed into the vertical slots in a rectangular plastic box to form a three-plate cell. The slots were so designed as to keep the strips ⅛ inch apart. The cell was filled with electrolyte (1.070 specific gravity sulfuric acid) and formed for 24 hours using a constant current equivalent to 15 mA/g of positive active material. After formation, the 1.070 acid was replaced with 1.300 specific gravity acid, and a conditioning charge of 9 mA/g of positive active material was applied for a period of 16 hours.

The cell was then tested over a period of 5 cycles of discharging and charging in the following manner:

The cell was discharged across a 10 ohm resistor and the time was recorded in each cycle to reach a terminal voltage of 1.8 volts during the discharging periods.

The resistor was chosen in each discharge period to provide an average current density of 7 mA/g of active material. The cell was next charged at 2.5 volts at limited current 120 mA for 16 hours for each charge period. The above discharge and charging procedure was carried out for a total of five complete cycles.

The cell successfully maintained an average voltage of 2.0 volts at an average efficiency of about 32.0% over five cycles. The capacity of the cell was 43 mAH/g of total plate weight.

EXAMPLE 2

In this example, a three-ply laminated electrode was again prepared as in Example 1 except polyethylene fibers were used instead of polypropylene.

The composite sheets were prepared according to the method in Example 1, and the metal foil employed was identical to the foil used in Example 1. The three-ply laminated structure was made using the procedure described in Example 1 except that the temperature was 138°C. The cell maintained an average voltage of 2.0V for the 5 cycles. The average cell efficiency was 44%. Cell capacity was 71 mAH/g of the total plate weight.

EXAMPLES 3–10

These examples show the effects of varying the amount of lead oxide active material in the composite sheets and the effects of varying the pressure of hot pressing the final laminated electrodes. Several laminated three-ply electrodes were prepared as in Example 1. The composite sheets contained varying amounts of active material (lead oxide) and the final electrodes were subjected to varying hot pressures and durations of pressings. Test cells were constructed and tested over five cycles according to the cell test procedure of Example 1.

The results obtained along with those of Example 1 are recorded in Table 1:

TABLE 1

| EXAMPLE | LEAD OXIDE CONTENT | SINTERING CONDITIONS PRESSURE (PSI) | TIME (MIN) | 1st Cycle % Cell Eff. | CYCLE LIFE 3rd Cycle % Cell Eff. | 5th Cycle % Cell Eff. | Cell Cap. mAH/g |
|---|---|---|---|---|---|---|---|
| 1 | 95 | 1200 | 10 | 35 | 27 | 39 | 43 |
| 3 | 90 | 400 | 15 | 18 | 15 | 10 | 13 |
| 4 | 95 | 400 | 10 | 16 | 16 | 15 | 12 |
| 5 | 95 | 800 | 15 | 20 | 12 | 19 | 25 |
| 6 | 90 | 1200 | 10 | 36 | 32 | 30 | 35 |
| 7 | 97 | 400 | 10 | 32 | 23 | 21 | 32 |
| 8 | 97 | 800 | 10 | 35 | 33 | 33 | 52 |
| 9 | 97 | 1200 | 10 | 45 | 37 | 30 | 52 |
| 10 | 97 | 1200 | 15 | 41 | 23 | 22 | 40 |
| 18 | 95 | 11500 | 15 | 35 | 49 | 50 | 101 |

EXAMPLE 11

This example illustrates the construction of a laminated 3-ply electrode using graphite paper as the center ply in place of the perforated lead sheet.

A three-ply laminated electrode was prepared as in Example 1 except that graphite paper was used as the center ply. A three electrode cell was prepared and tested as in Example 1. The cell maintained an average of 2.0 volts for the 5 cycles. The average cell efficiency was 9% and the cell capacity was 8 mAH/g.

EXAMPLE 12

This example illustrates the use of a solid lead foil sheet as the center ply instead of a perforated lead sheet. A three-ply laminated electrode was made according to the procedure of Example 1 using 35.2g of lead oxide to 1.9g of polypropylene fiber. A solid lead foil sheet was used as the center ply. A 3-electrode cell was made and tested according to the procedure of Example 1. The cell maintained an average of 2.0 volts over each cycle for moderated periods of time. Cell efficiency was 27% and the cell capacity was 65 mAH/g.

EXAMPLE 13

This example illustrates the use of lead powder as the active material in the electrode in place of the PbO. A composite sheet comprising 35.2g of lead powder and 1.9g of polypropylene fibers was made as in the procedure of Example 1. The laminated electrode was hot pressed at 165°C and 1200 psi for 15 minutes. A three electrode cell was made and tested as in Example 1 for 5 cycles. The cell maintained an average of 2.0 volts for moderate periods of time at an average cell efficiency of 10%. Cell capacity was 11 mAH/g.

EXAMPLES 14–15

These examples illustrate the use of tribasic lead sulfate and tetrabasic lead sulfate as active materials in the hand sheet. A composite sheet was made according to the procedure of Example 1 using different percentage of active material. A three-ply laminate was constructed as in Example 1 and a two electrode test cell was made and tested for cycle life. The results are given below:

| Material | EXAMPLE 14 Tetrabasic Lead Sulfate | EXAMPLE 15 Tri-basic Lead Sulfate |
|---|---|---|
| % Active Material | 83 | 66 |
| 1st Cycle - % Cell Eff. | 27.1 | 20.0 |
| 3rd Cycle - % Cell Eff. | 31.6 | 17.4 |
| 5th Cycle - % Cell Eff. | 29.7 | 15.6 |
| Cell Capacity - mAH/g | 14 | 13 |

The following examples are presented to illustrate the use of these laminated electrodes in a 2 volt cell. These laminated electrodes were used both as positive and negative plates. These positive and negative plates were separated from one another by the use of commercial battery separators.

Most any type of commercial separators may be used. The most common are perforated or porous sheets of polyvinyl chloride, rubber, polyethylene and resin coated heavy paper sheets.

EXAMPLE 16

This example illustrates the use of the laminated electrodes in a 2 volt battery cell having three positive and four negative plates. Seven laminated electrodes made by the procedure of Example 1 using PbO as the active material were inserted as plates in a rectangular Lucite container as shown in FIG. 2. Four of the plates were connected to a negative terminal while the remaining three were connected to a positive terminal. Both the positive and negative terminals extended above the container. Six commercial battery separators were placed between the positive and negative plates. The separators used were corrugated and perforated polyvinyl chloride sheets. A Lucite cover containing openings to accomodate the positive and negative terminals and also containing a vent hole for gas release was placed on top of the container.

The battery was filled with sulfuric acid electrolyte having a specific gravity of 1.070 and was formed for 24 hrs. using a constant current equivalent to 15 mA/g of active material. After formation, the acid was replaced with sulfuric acid having a specific gravity of 1.260. A conditioning charge of 9 mA/g of positive active material was applied over a period of 16 hrs.

The battery was tested over a period of 5 cycles according to the test cell procedure of Example 1 using a 4 ohm resistor at a discharge current of 0.5 amps.

The battery maintained an average of 2.0 volts for the 5 cycles. Battery efficiency was 27.4% and the battery capacity was 65.9 mAH/g.

EXAMPLE 17

In this example three of the 2 volt battery cells described in Example 16 were placed in series in a hedge-trimmer casing to form a 6 volt battery assembly. The three 2 volt battery cells powered the hedge-trimmer successfully.

EXAMPLE 18

In this example, a three-ply laminated electrode was prepared as in Example 1 except that a combination of fibers comprising 95% by weight polyethylene fibers and 5% by weight soft wood pulp fibers were used. The fibers of polyethylene were 0.4 denier and 1 mm long while the soft wood fibers were 2 denier and 3 mm long.

The composite sheets were prepared according to the method in Example 1, and the metal foil employed was identical to the foil used in Example 1. The three-ply laminated structure was made using the procedure described in Example 1, except the sintering temperature was 120°C and the pressure was 11,500 psi. The cell maintained an average voltage of 2.0 V for the 5 cycles. The average cell efficiency was 42.3%. Cell capacity was 101 mAH/g of the total plate weight.

The operational details and the results obtained are recorded in Table 1.

While this invention has been described and illustrated by the example shown, it is not intended to be strictly limited thereto, and other variations and modifications may be employed within the scope of the following claims:

We claim:

1. A laminated electrode containing three plies, the center ply being an electrically conductive sheet and the outer two plies each being a porous, compressed and sintered dry mat consisting essentially of a homogeneous mixture of synthetic fibers and active powder material, said electrically conductive sheet selected from the group consisting of lead foil, thin perforated lead sheet, paper sheet containing graphite and paper sheet containing lead metal powder, said active material employed in said dry mat selected from the group consisting of PbO, Pb, tribasic lead sulfate, tetrabasic lead sulfate and mixtures thereof, the amount of active powder material employed in said dry mat being from 50 to 99 parts by weight for each part of fiber, said fibers being from 90% to 100% synthetic fibers, the remainder being natural fibers, said fibers coated with said active material, said compressed and sintered dry mat positioned on each side of said conductive sheet forming a strong close bonded three ply laminate, said composite sheet formed by dispersing said fibers in water with agitation to form a slurry, adding powdered active material to said slurry and after thoroughly mixing, flocculating the dispersed slurry by lowering the pH until a large flocculated mass of fibers and active material is formed, filtering and drying said flocculated mass to form said composite sheet of a loose homogeneous mat of fibers coated with said active material, forming said laminated electrode by placing said composite sheet of said homogeneous mat of fibers coated with said active material on each side of a conductive sheet to form a sandwich and heating and compressing said sandwich at a temperature from 120°C. to 200°C. under pressure from atmospheric to 13000 psi to form said three-ply laminated electrode structure.

2. A light-weight lead-acid battery cell comprising a casing, at least one positive and one negative electrode in said casing, a separator for separating said electrodes, a positive and a negative terminal connected to said electrodes and extending through the top of said cell and a cover for said cell, said electrodes having a laminated configuration comprising a three-ply structure, the center ply being an electrically conductive sheet and the outer two plies each being a porous, compressed and sintered dry mat consisting essentially of a homogeneous mixture of synthetic fibers and active powder material, said electrically conductive sheet selected from the group consisting of lead foil, thin perforated lead sheet, paper sheet containing graphite and paper sheet containing lead metal powder, said active material employed in said dry mat selected from the group consisting of PbO, Pb, tribasic lead sulfate, tetrabasic lead sulfate and mixtures thereof, the amount of active powder material employed in said dry mat being from 50 to 99 parts by weight for each part of fiber, said fibers being from 90% to 100% synthetic fibers, the remainder being natural fibers, said fibers coated with said active material, said compressed and sintered dry mat positioned on each side of said conductive sheet forming a strong close bonded three ply laminate, said composite sheet formed by dispersing said fibers in water with agitation to form a slurry, adding powdered active material to said slurry and after thoroughly mixing, flocculating the dispersed slurry by lowering the pH until a large flocculaed mass of fibers and active material is formed, filtering and drying said flocculated mass to form said composite sheet of a loose homogeneous mat of fibers coated with said active material, forming said laminated electrode by placing said composite sheet of said homogeneous mat of fibers coated with said active material on each side of a conductive sheet to form a sandwich and heating and compressing said sandwich at a temperature from 120°C. to 200°C. under pressure from atmospheric to 13000 psi to form said three-ply laminated electrode structure.

\* \* \* \* \*